United States Patent
Standerfer et al.

(10) Patent No.: US 12,430,344 B1
(45) Date of Patent: Sep. 30, 2025

(54) SECURE DISTRIBUTED DOCUMENT DISCOVERY VIA VECTOR SIMILARITY

(71) Applicant: Amazon Technologies, Inc., Seattle, WA (US)

(72) Inventors: Joseph Vincent Standerfer, Austin, TX (US); Oshry Ben-Harush, Cedar Park, TX (US); Xin Liang, Redmond, WA (US); Te Ken, Leander, TX (US); Daryl Bernard Hammett, The Colony, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/612,996

(22) Filed: Mar. 21, 2024

(51) Int. Cl.
*G06F 16/2457* (2019.01)
*G06F 16/93* (2019.01)

(52) U.S. Cl.
CPC ........ *G06F 16/24578* (2019.01); *G06F 16/93* (2019.01)

(58) Field of Classification Search
CPC .................. G06F 16/24578; G06F 16/93
See application file for complete search history.

(56) References Cited

U.S. PATENT DOCUMENTS

| 10,216,766 | B2 | 2/2019 | Lin et al. |
| 11,042,776 | B1 | 6/2021 | Buhler et al. |
| 11,461,551 | B1* | 10/2022 | Thaine ............... G06F 16/3347 |
| 2022/0382900 | A1* | 12/2022 | Aoudia .................. H04L 9/008 |

FOREIGN PATENT DOCUMENTS

WO    WO 2024/182809    *  9/2024

* cited by examiner

*Primary Examiner* — Hau H Hoang
(74) *Attorney, Agent, or Firm* — S. Scott Foster; Kowert, Hood, Munyon, Rankin & Goetzel, P.C.

(57) ABSTRACT

Secure distributed document discovery via vector similarity is performed by a data discovery service. The service receives a request to perform a search using input data. The service sends the input data and an embedding protocol to different data repositories that comprise vector databases. The service receives a results from the different data repositories; each result identifies documents and corresponding document similarity scores. The service generates an overall ranking of the documents according to the document similarity scores. The service returns a query result that identifies the at least a portion of the documents and indicates the ranking of the identified documents.

20 Claims, 7 Drawing Sheets

User Interface
300

👤 joesa | ⚙

AI Search Agent

👤 Where are the contents of events webpages stored?

✦ I was not able to find an answer amongst the most relevant documents within your data connections.

Consider adding connectors or acquiring new permissions to the restricted docs below Available sources
- companyabc.com/q32dsq42/team-events
- companyabc.com/34252ev/events-schedule Restricted docs

| Rank | Similarity score | Owner |
|---|---|---|
| 1 | 0.030 | @grnng |
| 2 | 0.073 | @r2d3 |
| 3 | 0.102 | @thomson |

>

[ Clear chat ]

You are talking to C3PU chatbot who has access to the Solution Team's folder, ask a question.

Data connections
- My Docs
- Team A Docs
- Team X Docs
- HR & Benefits
- Solutions Team

[ Add more connections ]

FIG. 3

SECURE DISTRIBUTED DOCUMENT DISCOVERY VIA VECTOR SIMILARITY

BACKGROUND

Securing sensitive data is a critical challenge facing organizations today. Safeguarding confidential content is a top priority for various types of data, from financial records to personal health information. However, security measures used to safeguard data often create barriers to discovering information that may be highly useful for a particular user. For example, an employee of a company may not have access to or may be unaware of documents that are maintained by teams or other organizations of the company that the user does not belong to.

BRIEF DESCRIPTION OF THE DRAWINGS

FIG. 3 illustrates an example user interface to allow a user to provide search input data and to view query results based on secure distributed document discovery, according to at least some embodiments.

Figure 1:
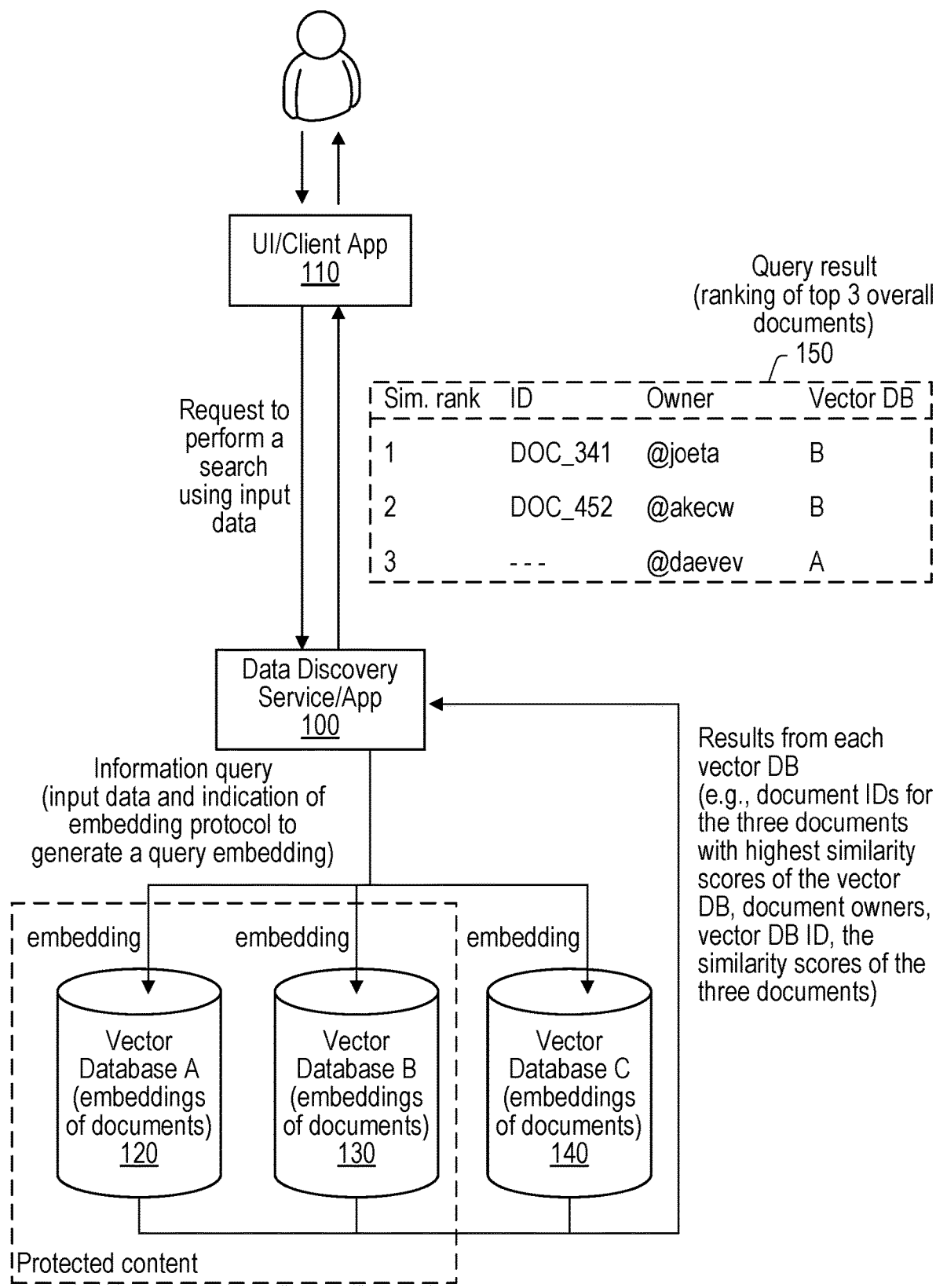
FIG. 1 illustrates a logical diagram of secure distributed document discovery via vector similarity, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for secure distributed document discovery via vector similarity are described herein. In embodiments, a machine learning (ML) model, such as a vector embedding model, learns semantic relationships between words and documents that persist to the resulting embedding vectors generated by the model. In an embodiment, these vector representations, stored in a vector database, enable approximate contextual searching to quickly surface relevant information for a given query. This may provide a level of data protection, since raw text is not preserved.

In some embodiments, by hiding the vector database and similarity calculations within a closed system, users can search secured content without exposing embedded data. In embodiments, only certain metadata may be returned to a user. For example, only document IDs or owner names for the most relevant content may be returned, allowing users to use the returned information to follow up with the document owners to request access. This may enable robust, secure search to connect users to relevant content across silos, accelerating productivity. In various embodiments, vector embedding balances information security with efficient discovery. Embodiments enable users to efficiently get access to the information they need, while confidential data remains protected.

In embodiments, a vector store represents content (e.g., document or any other content item) as numeric vectors in high-dimensional space, with similar content clustered together based on attributes. To find content within these databases, search queries are also encoded as vectors. In an embodiment, similarity scores are returned by calculating distances between the stored content vectors and the query vector to identify the most similar content. These numerical representations of similarity between the query and content entities can indicate how useful each document or store is for the query, without exposing underlying data.

In various embodiments, the similarity scores can be returned to the search engine as an indicator of where relevant information exists, enabling search across distribute access-controlled vector stores. Users can discover pertinent content without compromising security. This allows efficient relevance ranking and retrieval from otherwise siloed repositories. This approach of selective similarity exposure balances utility/efficiency and security for vector store search. Users get relevant results while data privacy is maintained.

Embodiments may utilize vector embedding models in order to represent documents, parts of documents or other content as high-dimensional numeric vectors. By encoding semantic relationships between terms, these vector representations allow similar content to cluster together in vector space. Vector similarity (e.g., a similarity score) can then be measured and/or generated using distance metrics including Euclidean, Hamming, or cosine distance.

In embodiments, documents from restricted repositories will first be ingested and embedded into a vector database using a proprietary embedding model not publicly available. This significantly obscures the original semantic meaning of the vectors, enhancing security. For further protection, access to a vector database may be tightly controlled through decentralized ownership. For example, a content owner (e.g., organization or an individual) can host their own private vector server and embedding model (e.g., as a private data repository). In embodiments, to enable cross-comparison of vectors between servers (e.g., between data repositories), this each host may use normalization and common dimension counts in their embedding frameworks. Embodiments may leverage vector embedding and decentralized hosting to enable secure, controlled analysis of restricted content.

In embodiments, when a user performs a keyword search, the query is also embedded into a vector using the same private embedding model used by the restricted databases (data repositories). A querying module (e.g., data discovery service/app) sends this vector to each restricted vector database, where it is compared against all stored document vectors. A similarity score for the top N matches in each store is returned to the querying module. The querying module aggregates these scores and ranks results by the highest similarities across all stores. In embodiments, the doc IDs or owner names associated with the top matches are returned to the user. The raw document contents and vectors remain securely hidden within each restricted store.

If desired, the user can follow up with owners of the relevant documents to request access. In embodiments, this preserves security while still allowing users to discover pertinent content across silos. Storing and retrieving relevant content references through a vector store of embeddings that only holds the vectors allows efficient yet secure search across otherwise disconnected data repositories. By exposing only the document IDs of similar content instead of raw vector data or text, information security is maintained while enabling robust cross-silo discovery.

FIG. 1 illustrates a logical diagram of secure distributed document discovery via vector similarity, according to some embodiments. In embodiments, data discovery service/app 100 may be a standalone system, single service, or one or many different services offered by a provider network, like provider network 201, discussed below. Data discovery service/app 100 may implement or make use of machine learning models and/or other machine learning techniques to perform various tasks. As discussed herein, in some embodiments the service may send/deploy a model to a data repository, which is used by the data repository to generate embedding that represent input data.

In embodiments, a machine learning model of the data discovery service/app 100 or of a data repository may be a neural network or other transformer based machine learning model, in some embodiments. The machine learning model may, in some embodiments, be a very large machine learning model, trained across a wide variety of data. In embodiments, the model may be trained across a large data set and implemented using any number of parameters.

As shown, the data discovery service/app 100 may send input data and an indication of an embedding protocol to any number of different data repositories that each host vector databases (e.g., database A 120, database B 130, and database C 140). Each data repository may generate a query embedding, based on the indicated embedding protocol, to generate a query embedding. As described herein, a similarity function may be applied at each data repository in order to generate similarity scores for different documents based on a comparison of embeddings of the vector database at the data repository and the query embedding generated by the machine learning model of the data repository.

Results for each of the vector DBs of each data repository are sent to the data discovery service/app 100 (e.g., metadata such as document IDs for N documents with highest similarity scores of the vector DB, document owners, vector DB ID, the similarity scores for each of the N documents; N can be any number, in various embodiments). In the example, "N" is three (results for 3 documents are returned for each vector DB and the query result shows the top 3 overall documents across data repositories). As shown, the data discovery service/app 100 evaluates the results from each vector DB to determine an overall ranking of the top X documents across all datastores. In the depicted example, the metadata for the documents with the three highest similarity scores are returned to the UI/client app 110 as a query result 150. The user may decide to contact the owners identified in the ranking, if the user desires to obtain any of the documents.

In embodiments, any number of vector databases may be unprotected (the content of the source documents and/or portions of content of the source documents may be accessed/returned in results). For example, the results from vector database C may include the content of the source document or a portion of the content (e.g., in addition to any of the metadata described above, such as document ID, owner, etc.). This allows a user/client to view unprotected content as part of the query result.

As discussed herein, in embodiments, the ML model used to generate the query embedding at a particular data repository may be the same ML model used by each of the data repositories to generate the embeddings of documents for the vector databases. By having the same model used across the different data repositories/vector DBs, the similarity scores can be compared across results from each vector DB to accurately determine the top overall documents for the query result ranking. In some embodiments, if a different model is used by a given data repository, then the service may normalize (e.g., adjust the numerical value) the similarity scores for documents from the given data repository such that the normalized similarity scores can be used to accurately compare the documents to other documents from other data repositories to determine the overall ranking for the query result.

Please note that the previous description of secure distributed document discovery via vector similarity is a logical illustration and thus is not to be construed as limiting as to the implementation of a data discovery service/app, machine learning model, machine learning system and/or vector database.

This specification continues with an example provider network that includes a service that implements secure distributed document discovery via vector similarity. An example user interface is then provided, followed by a general description of a provider network that implements multiple different services, including a data discovery service and other machine learning services, which may perform secure distributed document discovery via vector similarity. Then various examples of, including different components/modules, or arrangements of components/module that may be employed as part of implementing the provider network are discussed. A number of different methods and techniques to implement secure distributed document discovery via vector similarity are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
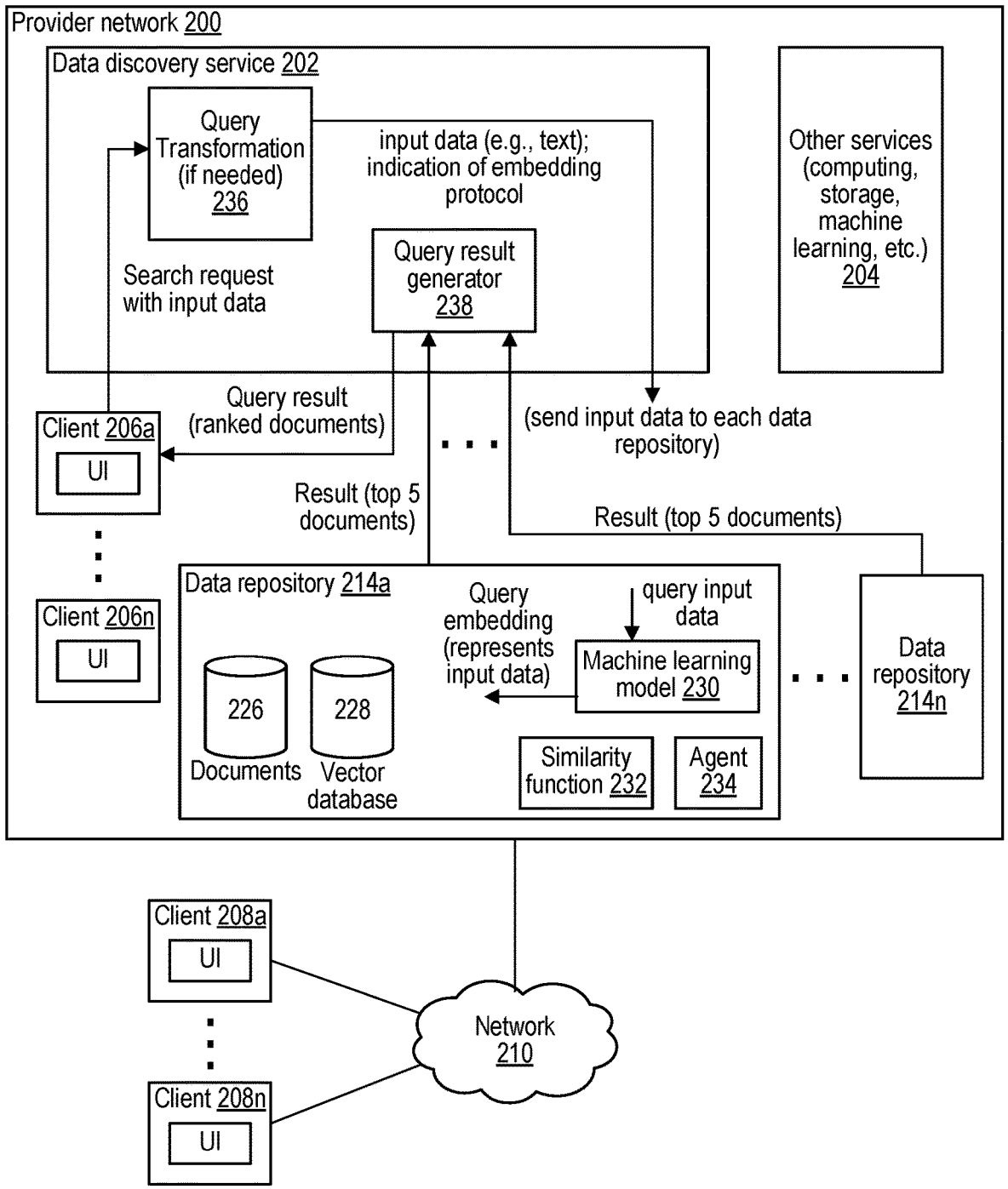
FIG. 2 illustrates an example provider network that may implement a service that implements secure distributed document discovery via vector similarity, according to some embodiments.

FIG. 2 illustrates an example provider network that includes a service that implements secure distributed document discovery via vector similarity, according to some embodiments.

In the depicted example, a provider network 200 implements a data discovery service 202 and any number of other services 204. As shown, any number of clients 206 (e.g., UI/client app 110) within the provider network and/or any number of clients 208 external to the provider network may access/use the data discovery service to submit search queries and to receive query results.

Network 310 may be a wide-area network (e.g., internet) that enables any number of remote clients 208 to communicate with the data discovery service 202 of the provider network 200. As shown, the provider network 200 may also include any number of local data repositories 214. In some embodiments, the network 310 may allow any number of remote data repositories may to be used in the same or similar way as described for the local data repositories 214 (e.g., data repositories that are external to the provider network 200).

The local data repositories 214 also include documents 226, a vector database 228 that includes embeddings that represent some or all of the documents, a machine learning model 230 that generates the embeddings based on the documents, a similarity function 232 that calculates similarity scores for documents based on comparison of the embeddings of the vector database and a query embedding that represents the input data (e.g., generated by the model 230 using the query input data received from the data discovery service), and an agent 234 that may communicate with the data discovery service 202. In embodiments, the agent may receive the input data from the data discovery service 202 and send a result back to the data discovery service 202 (e.g., metadata such as document IDs for N documents with highest similarity scores of the vector DB, document owners, vector DB ID, the similarity scores for each of the N documents). In the depicted example, a user of client 206*a* may enter input data at the client 206*a* (e.g., plain text input, such as in the form of a question or one or more words). In some embodiments, the input data may be text data/words that were generated based on speech input provided at the client (e.g., generated by a model). The client 206*a* sends a search request with the input data to the data discovery service 202.

In embodiments, the input data of the search request is sent to query transformation 236 to modify the input data and/or modify the input data. Query transformation 236 may add an indication of the embedding protocol to be used in order to generate an embedding using the input data. In embodiments, the embedding protocol may include an identifier/name of the machine learning model to be used (e.g., an ID/name of the model 230), a number of dimensions that the embedding is to have, the model itself, and/or an application programming interface (API) to be used to generate the embedding.

In some embodiments, the query transformation may remove some of the input data (e.g., text, words, etc.) and/or add additional input data (e.g., text, words, etc.) to the input data. The data discovery service 202 then sends the input data to multiple data repositories (e.g., any number of local data repositories 214 and/or external data repositories 212). In the example, the input data is sent to the data repositories 214*a*-214*n* (e.g., the input data and an indication of the embedding protocol).

Each data repository sends a result back to the data discovery service that indicates the documents that had the highest similarity scores. In the example, each data repository sends back a result that indicates the documents that had the five highest similarity scores. The query result generator 238 generates a query result (ranked documents and identifying metadata) and returns the query result to the client 206*a*. For example, the query result may indicate an overall ranking of the top 5 documents across all of the data repositories 214.

FIG. 3 illustrates an example user interface to allow a user to provide search input data and to view query results based on secure distributed document discovery, according to at least some embodiments.

In the depicted example, a user interface 300 allows a user to enter input data (Where are the contents of events webpages stored?), which is sent to the data discovery service to perform secure distributed document discovery, as described herein. As shown, a query result that indicates an overall ranking of the top 3 documents across all of the data repositories is displayed on the UI 300. In some embodiments, the user may provide input selecting one of the documents displayed on the UI. The data discovery service may receive the input indicating the selection and based on the input from the client, the service may send, to an endpoint, an indication of the selected document (e.g., sending a message or email to the document owner's email or messaging account indicating that the user is requesting access to the document).

In the depicted example, a list of data connections is provided on the UI. The data connections indicate the different data repositories that the data discovery service will search to perform secure distributed document discovery. In embodiments, the user may send a request to the data discovery service and/or to another user (e.g., administrator) to add another data repository to be used for future searches to perform secure distributed document discovery on behalf of the user.

Figure 4:
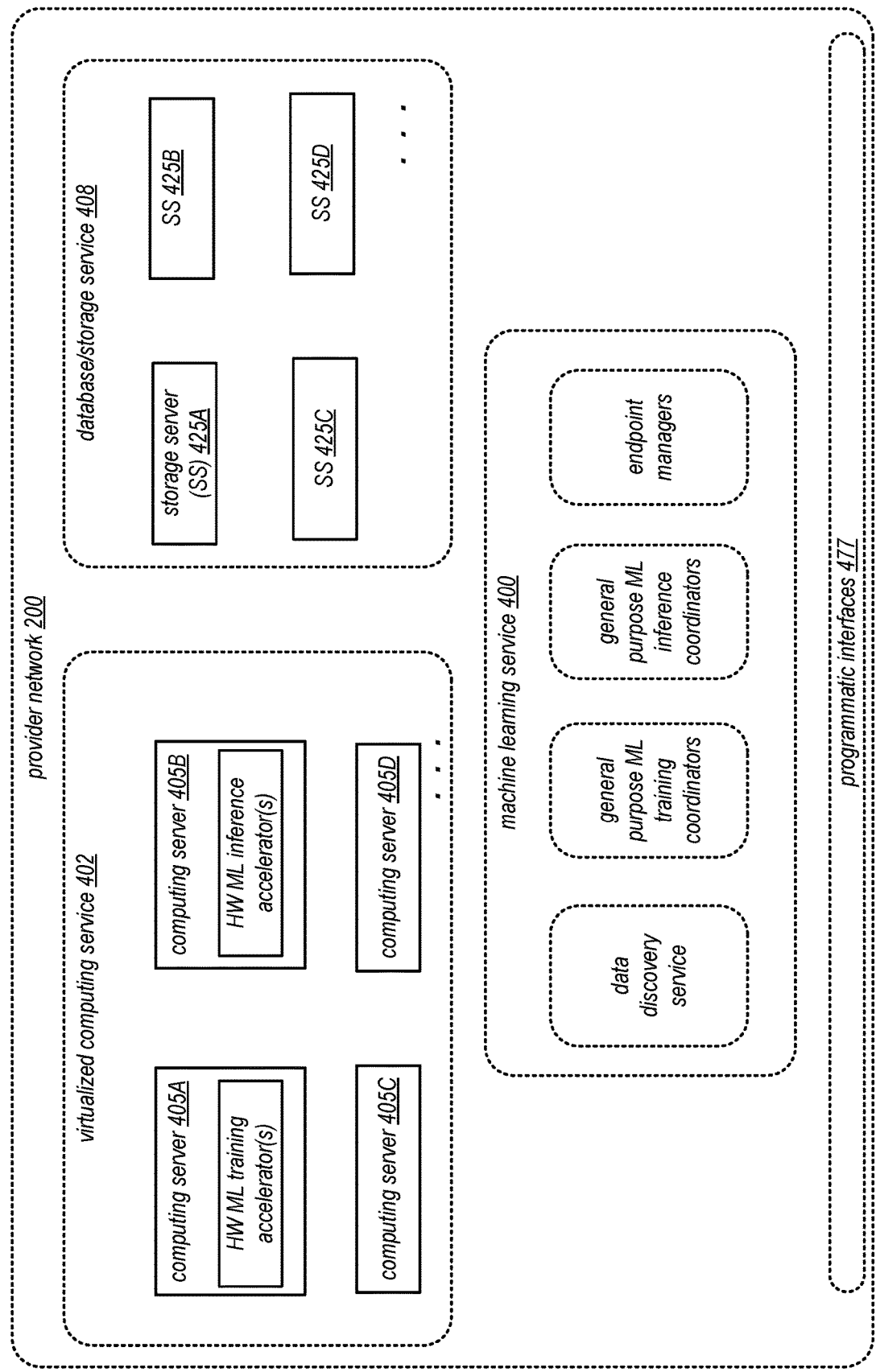
FIG. 4 illustrates an example provider network that implements multiple different services, according to some embodiments.

FIG. 4 illustrates an example provider network that implements multiple different services, according to some embodiments. In at least one embodiment, the techniques for secure distributed document discovery may be implemented as part of a provider network at a machine learning service 400, such as a data discovery service. In the embodiment shown in FIG. 2, in addition to the data discovery service, the machine learning service may include general purpose machine learning training coordinators, general purpose machine learning inference coordinators, and a set of endpoint managers. The general purpose training coordinators may be used to train models; similarly, the general purpose machine learning inference coordinators may be utilized to coordinate the generation of responses to inference requests that are directed to models. Endpoint managers may set up logical network endpoints for various models in some embodiments, with associated sets of automatically-scaled resources associated with a given endpoint. End users of the models may direct inference requests intended for a given target model to the network address of a logical endpoint set up for that model.

In the embodiment shown in FIG. 2, the virtualized computing service 402 may comprise a collection of computing servers which may be utilized as virtualization hosts, such as computing servers 405A-405D. Some of the computing servers may comprise one or more types of hardware accelerators, such as hardware machine learning training accelerators or hardware machine learning inference accelerators. A hardware machine learning training accelerator may comprise circuitry which is optimized to speed up training computations of large machine learning models such as large language models, and a hardware machine learning inference accelerator may comprise circuitry which is optimized to speed up inference computations of large machine learning models such as large language models.

The database/storage service 408 may comprise a plurality of storage servers such as SS 425A-425D, which may in some embodiments be used to store portions or all of training data, fine-tuning data sets, and other artifacts used by large language models of the data discovery service. Components of a given service of a provider network may thus utilize components of other services in the depicted embodiment—e.g., data discovery service may utilize compute instances run at the virtualized computing service, model artifacts of the machine learning service may be stored at the database/storage service, and so on. Individual ones of the services shown in FIG. 2 may implement a respective set of programmatic interfaces 477 which can be used by external and/or internal clients (where the internal clients may comprise components of other services) in the depicted embodiment. In at least some embodiments, resources of a cloud provider network may not be required or used for a data discovery service; instead, for example, a standalone set of servers may be used.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time.

Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, a data discovery service may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A virtualized computing service of the cloud provider network may offer virtual compute instances (also referred to as virtual machines, or simply "instances") with varying computational and/or memory resources in various embodiments, which may be used to implement functions of a data discovery service as indicated above. In one embodiment, each of the virtual compute instances may correspond to one of several instance types or families, and instances of any of several families may be employed for computations of the data discovery service. An instance type may be characterized by its hardware type, computational resources (e.g., number, type, and configuration of central processing units (CPUs) or CPU cores, hardware accelerators for various tasks including machine learning tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications).

Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the machine learning service or machine learning service, may broadly be subdivided into two categories in various embodiments: control plane operations and data plane operations. While the data plane represents the movement of data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, or system state information management).

The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Although FIGS. 2-4 have been described and illustrated in the context of a provider network implementing a data discovery service, the various components illustrated and described in FIGS. 2-4 may be easily applied to other systems that utilize secure distributed document discovery. As such, FIGS. 2-4 are not intended to be limiting as to other embodiments of secure distributed document discovery.

Figure 5:
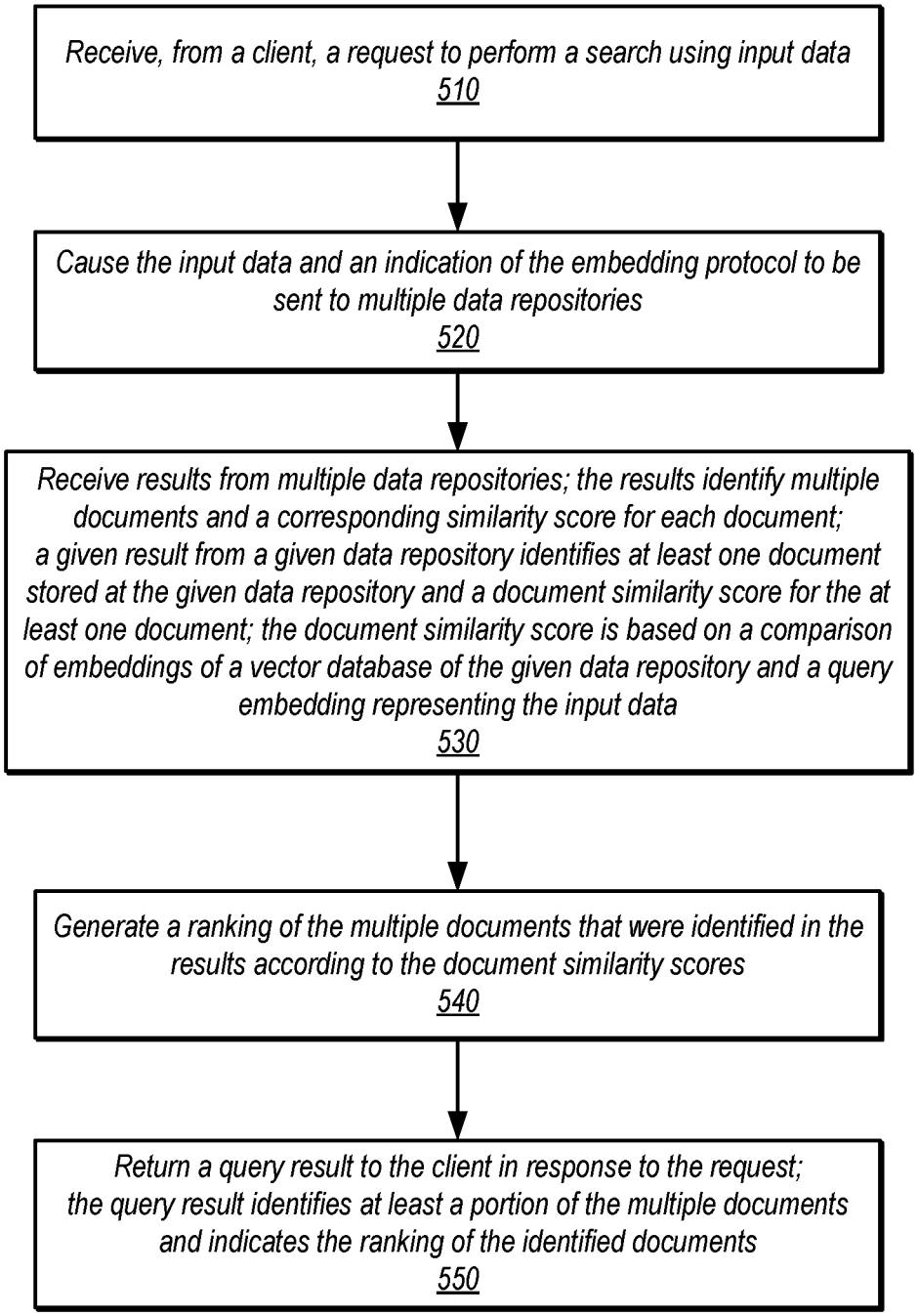
FIG. 5 illustrates a high-level flowchart of various methods and techniques to implement secure distributed document discovery via vector similarity, according to some embodiments.

FIG. 5 illustrates a high-level flowchart of various methods and techniques to implement secure distributed document discovery via vector similarity, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a data discovery service receives, from a client, a request to perform a search using input data. At block 520, the service causes the input data and an indication of the embedding protocol to be sent to multiple data repositories. At block 530, the service receives results from multiple data repositories; each of the results may identify multiple documents and a corresponding similarity score for each document. In embodiments, a given result from a given data repository identifies at least one document stored at the given data repository and a document similarity score for the at least one document; the document similarity score is based on a comparison of embeddings of a vector database of the given data repository and a query embedding that represents the input data (the query embedding is generated according to the embedding protocol; e.g., by a particular machine learning model at the data repository). In some embodiments, embeddings of documents of a vector database are encrypted according to a homomorphic encryption scheme (providing protection while allowing comparisons/similarity calculations to be made).

In some embodiments, the result from a data depository identifies a predefined number of documents with highest document similarity scores among documents stored at the data repository (e.g., top 5 documents). Different results from different data repositories of the plurality of data repositories identify documents using different types of metadata, based on different configurations at the different data repositories (e.g., providing the document ID and/or document owner ID and/or vector database ID and/or a link to request access to a document). By clicking on a link, a user may easily be directed to another endpoint/webpage that allows the user to submit a request to access the document (e.g., a message sent to an owner or manager of the document that indicates the user is requesting access to the document).

As mentioned above, based on different configurations of data repositories, different metadata may be provided in different results. For example, one data repository may provide a document ID, whereas another may not provide the document ID (only the document owner and/or the vector database ID may be indicated). In embodiments, the vector database and a similarity function of the data repository used to calculate the similarity score are prevented from being accessed by clients external to the data repository.

As indicated at 540, the service then generates a ranking of the multiple documents that were identified in the results according to the document similarity scores. At 550, the service returns a query result to the client in response to the request; the query result identifies at least a portion of the multiple documents and indicates the ranking of the identified documents.

Figure 6:
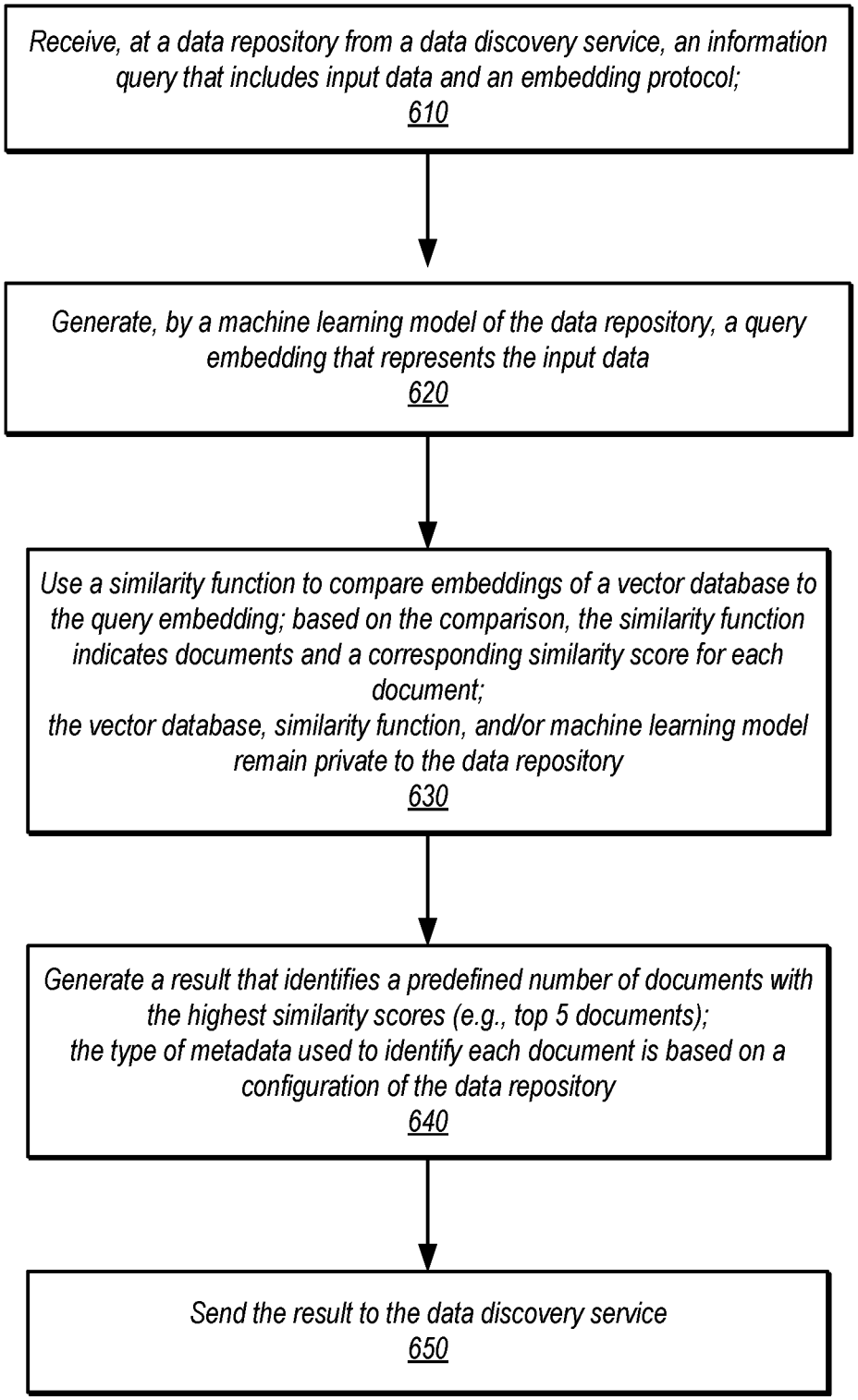
FIG. 6 illustrates a high-level flowchart of various methods and techniques to implement secure distributed document discovery via vector similarity, according to some embodiments.

FIG. 6 illustrates a high-level flowchart of various methods and techniques to implement secure distributed document discovery via vector similarity, according to some embodiments. As indicated at 610, a data repository receives, from a data discovery service, an information query that includes input data; as described herein, the information query may also indicate an embedding protocol.

At 620, a machine learning model of the data repository generates a query embedding that represents the input data. In embodiments, an agent at the data repository may determine, based on the embedding protocol (e.g., a model name), to use a particular machine learning model to generate the embedding. At 630, the data repository uses a similarity function to compare embeddings of a vector database to the query embedding. Based on the comparison, the similarity function indicates documents and a corresponding similarity score for each document; the vector database, similarity function, and/or machine learning model remain private to the data repository.

At 640, the data repository generates a result that identifies a predefined number of documents with the highest similarity scores (e.g., top 5 documents); the type of metadata used to identify each document is based on a configuration of the data repository. In embodiments, any type of metadata described herein may be included or excluded from the result for each document, depending on how a client/user has configured their data repository. At 650, the data repository (e.g., the agent) sends the result to the data discovery service.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the data discovery service described herein). The various methods as illustrated in the figures and described herein represent example embodiments of methods. The order of any method may be changed, and various elements may be added, reordered, combined, omitted, modified, etc.

Figure 7:
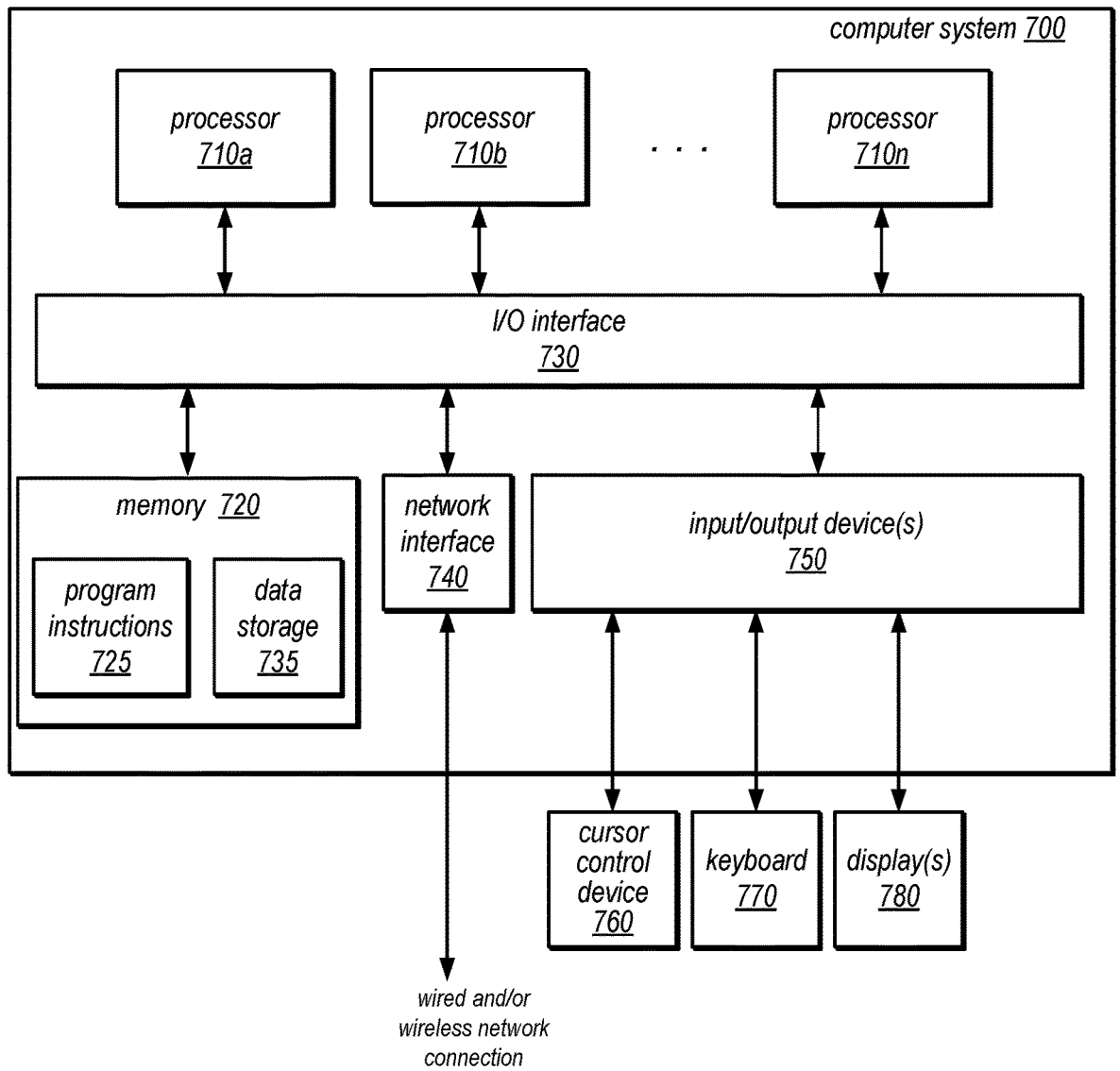
FIG. 7 illustrates an example system to implement the various methods, techniques, and systems described herein, according to some embodiments.

Embodiments of secure distributed document discovery via vector similarity as described herein may be executed on one or more computer systems, which may interact with various other devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) 780 may include standard computer monitor(s) and/or other display systems, technologies or devices. In at least some implementations, the input/output devices 750 may also include a touch- or multi-touch enabled device such as a pad or tablet via which a user enters input via a stylus-type device and/or one or more digits. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 720 may store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 720 as program instructions 725 and data storage 735, respectively. In other embodiments, program instructions and/or data may be received, sent or stored upon different types of computer-accessible media or on similar media separate from system memory 720 or computer system 700.

Generally speaking, a non-transitory, computer-readable storage medium may include storage media or memory media such as magnetic or optical media, e.g., disk or CD/DVD-ROM coupled to computer system 700 via I/O interface 730. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, that implement the various methods and techniques as described herein, and data storage 735, comprising various data accessible by program instructions 725. In one embodiment, program instructions 725 may include software elements of embodiments as described herein and as illustrated in the Figures. Data storage 735 may include data that may be used in embodiments. In other embodiments, other or different software elements and data may be included.

Those skilled in the art will appreciate that computer system 700 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication.

Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description is to be regarded in an illustrative rather than a restrictive sense.

What is claimed is:

1. A system, comprising:
   a plurality of computing devices, respectively comprising at least one processor and a memory, that implement a data discovery service, wherein the data discovery service is configured to:
   receive, from a client, a request to perform a search using input data;
   send the input data and an indication of an embedding protocol to a plurality of data repositories that comprise vector databases, wherein a given vector database of a data repository comprises respective embeddings of documents generated using a machine learning model of the data repository;
   receive a plurality of results from the plurality of data repositories that identifies a plurality of documents and corresponding document similarity scores, wherein a given result from a given data repository identifies at least one document stored at the given data repository and a document similarity score for the at least one document, and wherein the document similarity score for the at least one document is based on a comparison of embeddings of a vector database at the given data repository and a query embedding that represents the input data, wherein the query embedding is generated at the given data repository according to the indication of the embedding protocol received by the given data repository, and wherein the vector database and a similarity function of the data repository used to calculate the similarity score are prevented from being accessed by clients external to the data repository;

generate a ranking of the plurality of documents according to the document similarity scores; and return a query result to the client in response to the request, wherein the query result identifies at least a portion of the plurality of documents and indicates the ranking of the identified documents.

2. The system of claim 1, wherein to receive the plurality of results from the plurality of data repositories, the data discovery service is configured to, for respective data repositories of the plurality of data repositories:

receive a result that identifies a predefined number of documents with highest document similarity scores among documents stored at the data repository.

3. The system of claim 1, wherein different results from different data repositories of the plurality of data repositories identify documents using different types of metadata, based on different configurations at the different data repositories.

4. The system of claim 3, wherein the embedding protocol comprises one or more of an identifier of the machine learning model or a number of dimensions of the embedding, and wherein the different types of metadata comprise one or more of document ID, document owner ID, vector database ID, or a link to request access to a document.

5. The system of claim 1, wherein the document similarity score for the at least one document is based on calculation of a distance metric between the embeddings of the vector database at the given data repository and the query embedding, the distance metric comprising a Euclidean distance, a Hamming distance, or a cosine distance.

6. A method, comprising:

receiving, by a data discovery service, a request to perform a search using input data;

sending the input data and an indication of an embedding protocol to a plurality of data repositories that comprise vector databases, wherein a given vector database of a data repository comprises respective embeddings of documents generated using a machine learning model of the data repository;

receiving a plurality of results from the plurality of data repositories that identifies a plurality of documents and corresponding document similarity scores, wherein a given result from a given data repository identifies at least one document stored at the given data repository and a document similarity score for the at least one document, and wherein the document similarity score for the at least one document is based on a comparison of embeddings of a vector database at the given data repository and a query embedding that represents the input data, wherein the query embedding is generated at the given data repository according to the indication of the embedding protocol received by the given data repository;

generating a ranking of the plurality of documents according to the document similarity scores; and providing a query result in response to the request, wherein the query result identifies at least a portion of the plurality of documents and indicates the ranking of the identified documents.

7. The method of claim 6, wherein the vector database and a similarity function of the data repository used to calculate the similarity score are prevented from being accessed by clients external to the data repository.

8. The method of claim 6, wherein receiving the plurality of results from the plurality of data repositories comprises, for respective data repositories of the plurality of data repositories:

receiving a result that identifies a predefined number of documents with highest document similarity scores among documents stored at the data repository.

9. The method of claim 6, wherein different results from different data repositories of the plurality of data repositories identify documents using different types of metadata, based on different configurations at the different data repositories.

10. The method of claim 9, wherein the embedding protocol comprises one or more of an identifier of the machine learning model or a number of dimensions of the embedding, and wherein the different types of metadata comprise one or more of document ID, document owner ID, or vector database ID.

11. The method of claim 6, wherein a provider network hosts the data discovery service, and wherein one or more of the plurality of data repositories is hosted by a remote network.

12. The method of claim 6, further comprising:

receiving, from a client of the data discovery service, input indicating selection of one of the documents identified by the query result; and based on the input from the client, send, to an endpoint, an indication of the selected document.

13. The method of claim 6, wherein embeddings of documents of a vector database of at least one of the plurality of data repositories are encrypted according to a homomorphic encryption scheme.

14. One or more non-transitory, computer-readable storage media, storing program instructions that when executed on or across one or more computing devices cause the one or more computing devices to implement a data discovery service that implements:

receiving a request to perform a search using input data;

sending the input data and an indication of an embedding protocol to a plurality of data repositories that comprise vector databases, wherein a given vector database of a data repository comprises respective embeddings of documents generated using a machine learning model of the data repository;

receiving a plurality of results from the plurality of data repositories that identifies a plurality of documents and corresponding document similarity scores, wherein a given result from a given data repository identifies at least one document stored at the given data repository and a document similarity score for the at least one document, and wherein the document similarity score for the at least one document is based on a comparison of embeddings of a vector database at the given data repository and a query embedding that represents the input data, wherein the query embedding is generated at the given data repository according to the indication of the embedding protocol received by the given data repository;

generating a ranking of the plurality of documents according to the document similarity scores; and providing a query result in response to the request, wherein the query result identifies at least a portion of the plurality of documents and indicates the ranking of the identified documents.

15. The one or more non-transitory, computer-readable storage media of claim 14, wherein the vector database and a similarity function of the data repository used to calculate the similarity score are prevented from being accessed by clients external to the data repository.

16. The one or more non-transitory, computer-readable storage media of claim 14, wherein to receive the plurality of results from the plurality of data repositories, program instructions when executed on or across the one or more computing devices, cause the machine learning service to further implement, for respective data repositories of the plurality of data repositories:
receiving a result that identifies a predefined number of documents with highest document similarity scores among documents stored at the data repository.

17. The one or more non-transitory, computer-readable storage media of claim 14, wherein different results from different data repositories of the plurality of data repositories identify documents using different types of metadata, based on different configurations at the different data repositories.

18. The one or more non-transitory, computer-readable storage media of claim 17, wherein the embedding protocol comprises one or more of an identifier of the machine learning model or a number of dimensions of the embedding, and wherein the different types of metadata comprise one or more of document ID, document owner ID, or vector database ID.

19. The one or more non-transitory, computer-readable storage media of claim 14, wherein embeddings of documents of a vector database of at least one of the plurality of data repositories are encrypted according to a homomorphic encryption scheme.

20. The one or more non-transitory, computer-readable storage media of claim 14, wherein the document similarity score for the at least one document is based on calculation of a distance metric between the embeddings of the vector database at the given data repository and the query embedding, the distance metric comprising a Euclidean distance, a Hamming distance, or a cosine distance.

* * * * *